(12) United States Patent
Bull et al.

(10) Patent No.: US 6,799,270 B1
(45) Date of Patent: Sep. 28, 2004

(54) SYSTEM AND METHOD FOR SECURE DISTRIBUTION OF DIGITAL INFORMATION TO A CHAIN OF COMPUTER SYSTEM NODES IN A NETWORK

(75) Inventors: John A. Bull, Great Brington (GB); David J. Otway, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 09/404,955

(22) Filed: Sep. 24, 1999

Related U.S. Application Data

(60) Provisional application No. 60/106,374, filed on Oct. 30, 1998.

(51) Int. Cl.[7] .............................................. G06F 13/12
(52) U.S. Cl. ........................ 713/153; 713/155; 713/156
(58) Field of Search ............................... 713/153, 155, 713/156, 161, 168, 171, 176

(56) References Cited

U.S. PATENT DOCUMENTS

| | | | |
|---|---|---|---|
| 5,491,750 A | 2/1996 | Bellare et al. ................. | 380/21 |
| 5,956,407 A | 9/1999 | Slavin ........................... | 380/30 |

FOREIGN PATENT DOCUMENTS

| | | | |
|---|---|---|---|
| EP | 0 405 215 | 1/1991 | ............. H04L/9/08 |
| EP | 0851628 A1 | 4/1998 | ............. H04L/9/08 |

OTHER PUBLICATIONS

P.Y.A. Ryan, S.A. Schneider, "An attack on a recursive authentication protocol A cautionary tale" *Information Processing Letters* 65, 1998 Elsevier Science B.V., pp. 7–10.

Dave Otway and Owen Rees, "Efficient and Timely Mutual Authentication", The ANSA Project, 24 Hills Road, Cambridge CB21JP United Kingdom, pp. 8–10.

Lawrence C. Paulson, "Mechanized Proofs for a Recursive Authentication Protocol" Computer Laboratory, University of Cambridge, Pembroke Street, Cambridge CB2 3QG, England, pp. 84–94.

Li Gong, "Using One–Way Functions for Authentication" University of Cambridge Computer Laboratory, Cambridge CB2 3QG, England, Jul. 1989, pp. 8–11.

Examination Report under Section 18 (3), Application No. GB 9925678.6, 3 pgs.

Search Report under Section 17, Application No. GB 9925678.6, 3 pgs.

Bull et al. "The Authentication Protocol", DRA/CIS3/PROJ/CORBA/SC/1/CSM/436–04/03, Feb. 25, 1997, 20 pgs.

*Primary Examiner*—Thomas R. Peeso
(74) *Attorney, Agent, or Firm*—Lahive & Cockfield LLP; John D. Lanza

(57) ABSTRACT

Described are a system and method for securely distributing session keys over a network to each node in a chain of computer system nodes. The chain of nodes recursively constructs and presents a nested request to the authentication server. The nested request includes a request from each of the nodes in the chain requiring a session key to communicate with a neighboring node. The authentication server recursively unravels the request and recursively prepares a response that includes a session key for each node that submitted a request. The response traverses the chain of nodes in the reverse order taken by the nested request to reach the authentication server. Each node receiving the response extracts the portion of the response directed to that node, and forwards the remainder of the response, if any, to the next node in the chain. Thus, with a single traversal of the chain of nodes each node receives at least one session key. The forward and reverse protocols easily generalize for any number of nodes in the chain. The protocols can employ one-way hash functions to seal requests and responses and to encode session keys.

23 Claims, 8 Drawing Sheets

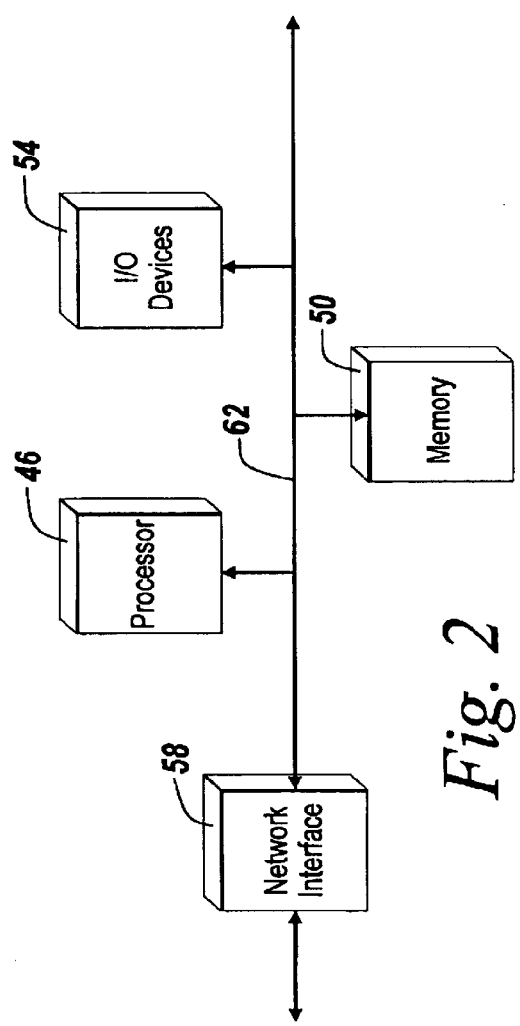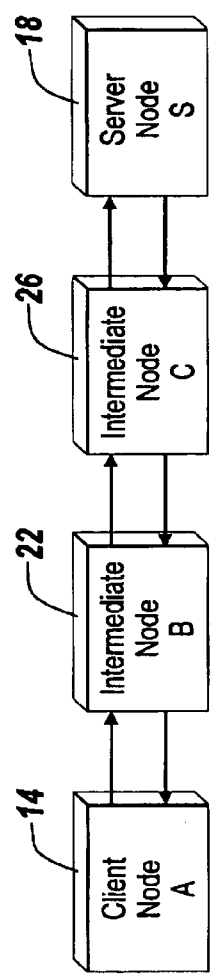

SYSTEM AND METHOD FOR SECURE DISTRIBUTION OF DIGITAL INFORMATION TO A CHAIN OF COMPUTER SYSTEM NODES IN A NETWORK

RELATED APPLICATION

This application claims the benefit of U.S. Provisional Application, Serial No. 60/106,374, filed Oct. 30, 1998 and incorporated by reference herein.

FIELD OF THE INVENTION

The invention relates generally to client-server computer networks. More specifically, the invention relates to a system and method for securely distributing information among clients and servers in a network.

BACKGROUND OF THE INVENTION

Authentication of computer systems plays an important role in data communications over modem networks. With the rapidly increasing reliance on the electronic highways to convey sensitive data comes the greater need for increased security for such data transmissions. Computer systems need to be mutually assured of the identities of those computer systems with which they exchange information. Further, these computer systems need the assurance that the information in these communications has not been altered during transmission. These needs have led to various techniques that enable computer systems to exchange information securely.

One common authentication technique entails presenting a challenge to the computer system to which the computer system must correctly respond in order to gain permission for subsequent communication. Other authentication techniques involve encryption methods. Generally, there are two main types of encryption methods: asymmetric encryption and symmetric encryption. Asymmetric encryption methods use two different keys, one to encrypt the communication and the other to decrypt the communication. For example, public-key encryption is an asymmetric encryption technique in which one computer system encrypts a communication using a public key and another computer system decrypts the communication using a private key known only to that other computer system. In contrast, symmetric encryption uses one key for both encryption and decryption. Some authentication techniques combine asymmetric and symmetric encryption methods. One exemplary technique is to use public key encryption to distribute a session key to a pair of computer systems that these computer systems then use with symmetric encryption algorithms to exchange encrypted data communications.

An important factor to be considered when using encryption algorithms, however, is that some countries limit the key size for encryption within exported computer and software products. It is understood by those skilled in the art that such encryption algorithms, when constrained by the key size, may be broken.

SUMMARY OF THE INVENTION

In a network including a first node, a second node, and a third node, the invention features a method for securely delivering digital information to the first node from the third node by way of the second node. The method includes receiving a request at the third node from the first node. In response to the request, digital information is generated. The request and the digital information are then operated on to produce a first data structure. The first data structure includes a representation of the digital information. The request and the first data structure are then operated on to produce a second data structure, with the second data structure including the first data structure. The second data structure is transmitted to the second node.

In one embodiment, the digital information includes a session key for the first node to use when communicating with the second node. The session key is encoded using a key shared exclusively with the first node to conceal the session key within the first data structure. Also, the session key can be used to seal a portion of the first data structure. A second session key can be generated for the second node to use in communications with the first node. This second session key can be used to seal a portion of the second data structure containing the first data structure. Also, the second session key can be encoded using a key shared exclusively with the second node. The second data structure includes the encoded second session key.

In another aspect, the invention features a method for securely delivering a session key to a client node from an authentication server node in response to a request from the client node. The method includes sealing plaintext using the session key. The session key is encoded using a key shared with the client node. A data structure including the encoded session key and the sealed plaintext is transmitted to the client node. At the client node, the data structure can be extracted. The encoded session key is decoded using the shared key, and the seal of the plaintext checked using the decoded session key. The plaintext can be used to authenticate that the session key originated from the authentication server, that the decoded session key is unaltered during transmission from the authentication server, and that the data structure is a current response from the authentication server to the request from the client node.

In another aspect, the invention features a system for securely distributing a session key by way of a network. The network includes a first node transmitting a request to obtain the session key and a second node in communication with the first node. The system also includes a third node in communication with the second node for receiving the request by way of the second node. The third node has a processor that generates a first data structure by operating on the request and the session key. The resulting first data structure includes a representation of the session key. The processor also generates a second data structure by operating on the request and the first data structure. The second data structure includes the first data structure.

BRIEF DESCRIPTION OF THE DRAWINGS

The invention is pointed out with particularity in the appended claims. The above and further advantages of the invention may be better understood by referring to the following description in conjunction with the accompanying drawings, in which:

FIG. 2 is a diagram of an embodiment of functional components within each computer node;

FIG. 3 is a diagram showing two exemplary forward flows of requests from the client node through two intermediate nodes to the authentication server node;

DESCRIPTION OF THE INVENTION

Figure 1:
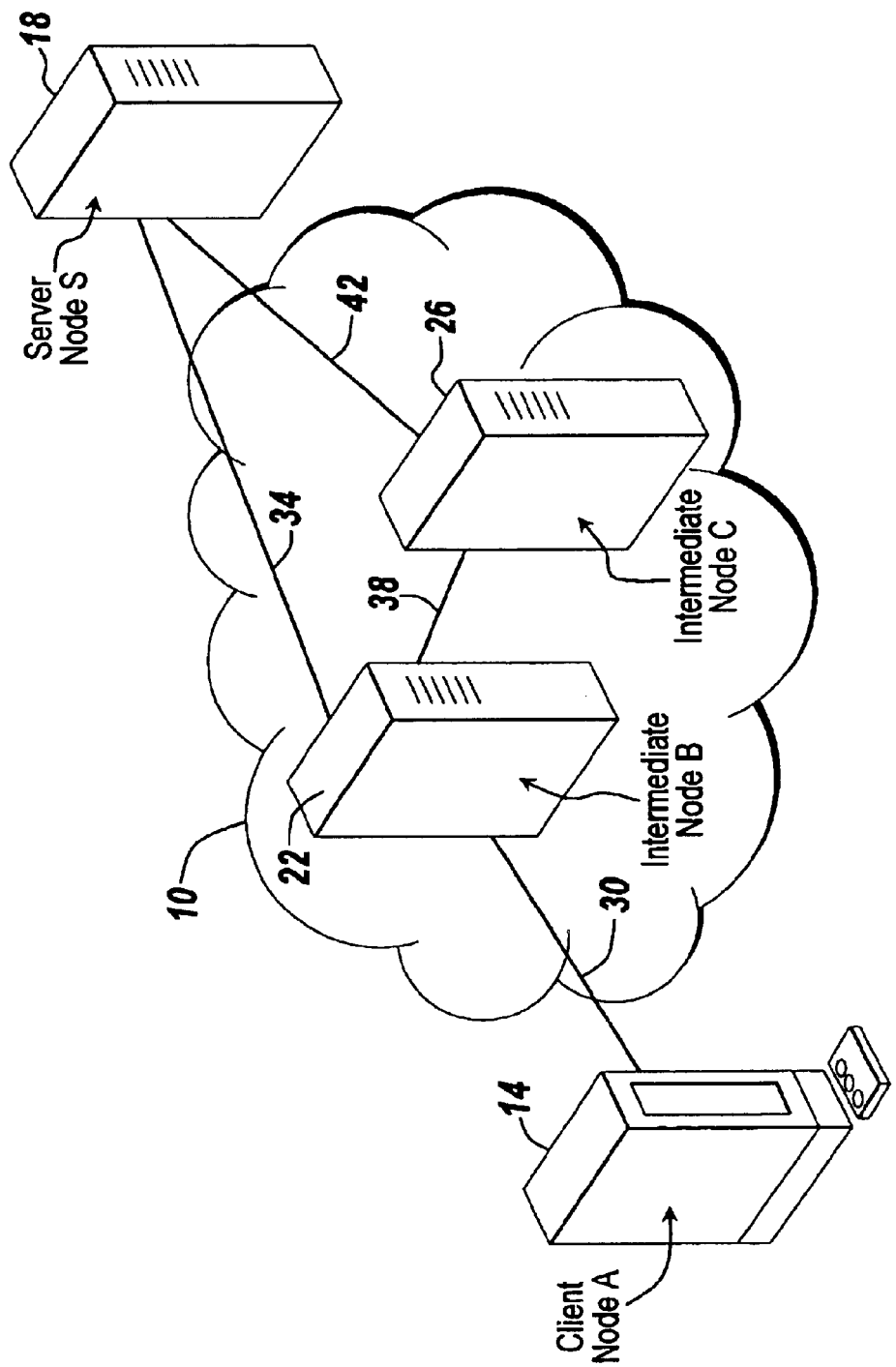
FIG. 1 is a diagram of an embodiment of a client node in communication with an authentication server node over a network.

FIG. 1 shows an exemplary client-server system 2 embodying the principles of the invention. The client-server system 2 includes a computer system (client node A) 14 in communication with another computer system (authentication server node S) 18 over a network 10 through a first and a second intermediate computer systems (intermediate nodes B and C) 22 and 26, respectively. It is to be understood that the system 2 can include any number of additional client, intermediate, and server nodes. Some of such intermediate nodes can merely forward information without participating in the authentication process. The network 10 can be, for example, a wide area network (WAN) or a local area network (LAN), an international network of networks, such as the Internet and the World Wide Web, or a network within a single organizational entity, called an Intranet.

FIG. 2 shows functional components of an exemplary embodiment of the each node 14, 18, 22, and 26. Each node 14, 18, 22, and 26 can be any conventional personal computer, workstation, network terminal, mini-computer, or mainframe computer. Each can include a processor 46, memory 50 for storing data and software programs, and I/O devices 54 (e.g., a keyboard and/or a mouse) in communication by way of a signal bus 62. Each node 14, 18, 22, 26 also includes a network interface 58 for communicating with the network 10. Stored in the memory 50 of each node are software routines for performing the authentication protocol of the invention as described below. These software routines (1) generate authentication requests, (2) evaluate authentication requests, (3) generate responses to authentication requests, and (4) evaluate responses. The processor 46 of each node executes the appropriate software routines to effectuate a forward flow (i.e., toward the server S 18) of authentication requests and a return flow (i.e., away from the server S 18) of responses as described below.

Referring again to FIG. 1, two exemplary communication paths traverse the network 10 from the client node A 14 to the authentication server node S 18. Each communication path can be represented as a "chain of nodes." A first chain of nodes includes the client node A 14, the first intermediate node B 22, and the authentication server node S 18. The first intermediate node B 22 is in communication with the client node A 14 by way of the communication link 30 and with the authentication server node S 18 by way of the communication link 34.

A second exemplary chain of nodes includes the client node A 14, the first intermediate node B 22, the second intermediate node C 26, and the authentication server node S 18. The first intermediate node B 22 is in communication with the client node A 14 by way of communication link 30 and with the second intermediate node C 26 by way of communication link 38. The second intermediate node C 26 is also in communication with the authentication server node S 18 by way of a communication link 42. The two chains of nodes are merely exemplary; a chain of nodes can have any number of intermediate nodes between the client node A 14 and the authentication server node S 18 that employ the authentication protocol. Other embodiments include intermediate nodes that may not seek authentication or session keys, and therefore do not use the authentication protocol, but rather operate in the chain of nodes to forward requests and responses to the next neighboring node in the chain.

The client node A 14 initiates authentication requests. For example, a user of the client node A 14 can submit a digital signature to approve a transaction. The first intermediate node B 22 can be a client-server node. Examples of intermediate nodes include a counter signer for approving financial transactions exceeding a dollar amount limit, a corporate signer for validating the signature of the client node A 14, a sacrificial server disposed between the two firewalls, and a business process server in front of a back end database server.

Each node 14, 18, 22, 26 can function in the network 10 in the capacity of a client node, an intermediate node, or an authentication server depending upon the position of that node in a chain of nodes. For example, the client node A 14 and the authentication server node S 18 can function as an intermediate node when that node 14 or 18 receives a request to be forwarded to another authentication server. Each intermediate node 22, 26 and the authentication server node S 18 can operate as a client intermediate node 22 by initiating an authentication request. The client node A 14 and each intermediate node 22, 26 can function in the role of an authentication server.

The authentication protocol assumes that each node 14, 22, and 26 shares a secret key exclusively with the authentication server 18. In the following description, the key shared by the client node A 14 and the authentication server node S 18 is referred to as Ka, by the first intermediate node B 22 and the authentication server node S 18 is Kb, and by the second intermediate node C 26 and the authentication server node S 18 is Kc. The client node A 14 and each intermediate node 22, 26 trusts the authentication server node S 18. That is, each node 14, 22, 26 accepts that the authentication server 18 correctly performs the function of identifying the nodes 14, 22, 26 by way of the secret keys that the server node S 18 shares with each node 14, 22, 26

In the example shown, the nodes 14, 18, 22, 26 communicate using an authentication protocol in accordance with the principles of the invention. When used between nodes needing authentication, the authentication protocol operates to provide authentication between pairs of nodes in a chain of nodes in the client-server system 2. Authentication occurs at various points in the protocol. First, each node receiving a message is assured of the identity of the node transmitting the message so that communications are not conducted with an impostor. Second, the protocol assures that the contents of the received message are authentic in that such contents have not be altered during transmission from the transmitting node to the receiving node. Third, the protocol assures the timeliness of the received message in that the message is received in response to a particular request and is not an attempt by an intruder to mimic a previous authentic communication.

The authentication protocol also produces session keys for each pair of nodes as described below. Each session key can be a randomly generated value used for signing messages or encryption. Only nodes possessing the same session key for decoding the encryption can understand encrypted communications. Consequently, two or more nodes having the same session key can communicate privately. Session keys exist only for the duration of a particular session (or conversation). Accordingly, nodes can request session keys as needed and subsequently destroy the session keys when the conversations are complete.

FIG. 3 shows an exemplary chain of nodes illustrating a bidirectional flow of requests and responses. Requests pass to and responses pass from the authentication server node S 18. In brief overview, in one embodiment the client node A 14 generates a request for authentication and for obtaining a session key and transmits the request to the first intermediate node B 22. The request includes both plain text and sealed text. The first intermediate node B 22 adds its authentication information to the original request from the client node A 14 to generate a new authentication request and forwards the new authentication request to the second intermediate node C 26. Nested within the new authentication request is the original request from the client node A 14.

The second intermediate node C 26 adds information to the request from the first intermediate node B 22 to generate a second new authentication request and forwards the second new authentication request to the authentication server node S 18. Nested within the second new authentication request is the authentication request received from the first intermediate node B 22, within which is the original request from the client node A 14. The process can be repeated for as many intermediate nodes as are in the chain of nodes. The authentication server node S 18 receives a final request containing the nested requests of each intermediate node 22, 26 and the client node A 14.

According to the principles of the invention, the authentication server node S 18 recursively unravels the final request containing the nested requests to determine those nodes in the chain that are expecting a response. From the unraveling of the final request, the authentication server node S 18 determines an order in which to recursively nest responses to each of the nodes in the chain within a final response. Consequently, the final response includes a response to each node in the chain, and each response includes at least one session key for that respective node in the chain. The individual responses are nested within each other, as described further below, with the response to the client node A 14 being most deeply nested within the final response.

In the embodiment shown, the authentication server node S 18 transmits the final response to the second intermediate node C 26. Each node in the chain extracts and authenticates at least one session key directed to that node from the final response, and forwards the remainder of the response to the next node in the chain away from the server 18. Accordingly, with the final response the authentication server node S 18 delivers session keys and provides authentication to each node in a chain. It is to be understood that the principles of the invention can be extended to securely transmit any type of information and not just session keys. Also, the protocol can extend to any number of nodes in a chain. An advantage gained by the authentication protocol of the invention is that each node in the chain does not need knowledge of the global behavior of the system 2 to achieve authentication and obtain a session key.

In one embodiment, the authentication server node S 18 can deliver the same session key to pairs of adjacent nodes, such as, for example, the client node A 14 and the first intermediate node B 22. In other embodiments, the authentication server node S 18 can deliver the same session key to nodes that are separated by one or more intermediate nodes, e.g., the client node A 14 and the second intermediate node C 26.

Generation of an Authentication Request

Figure 4:
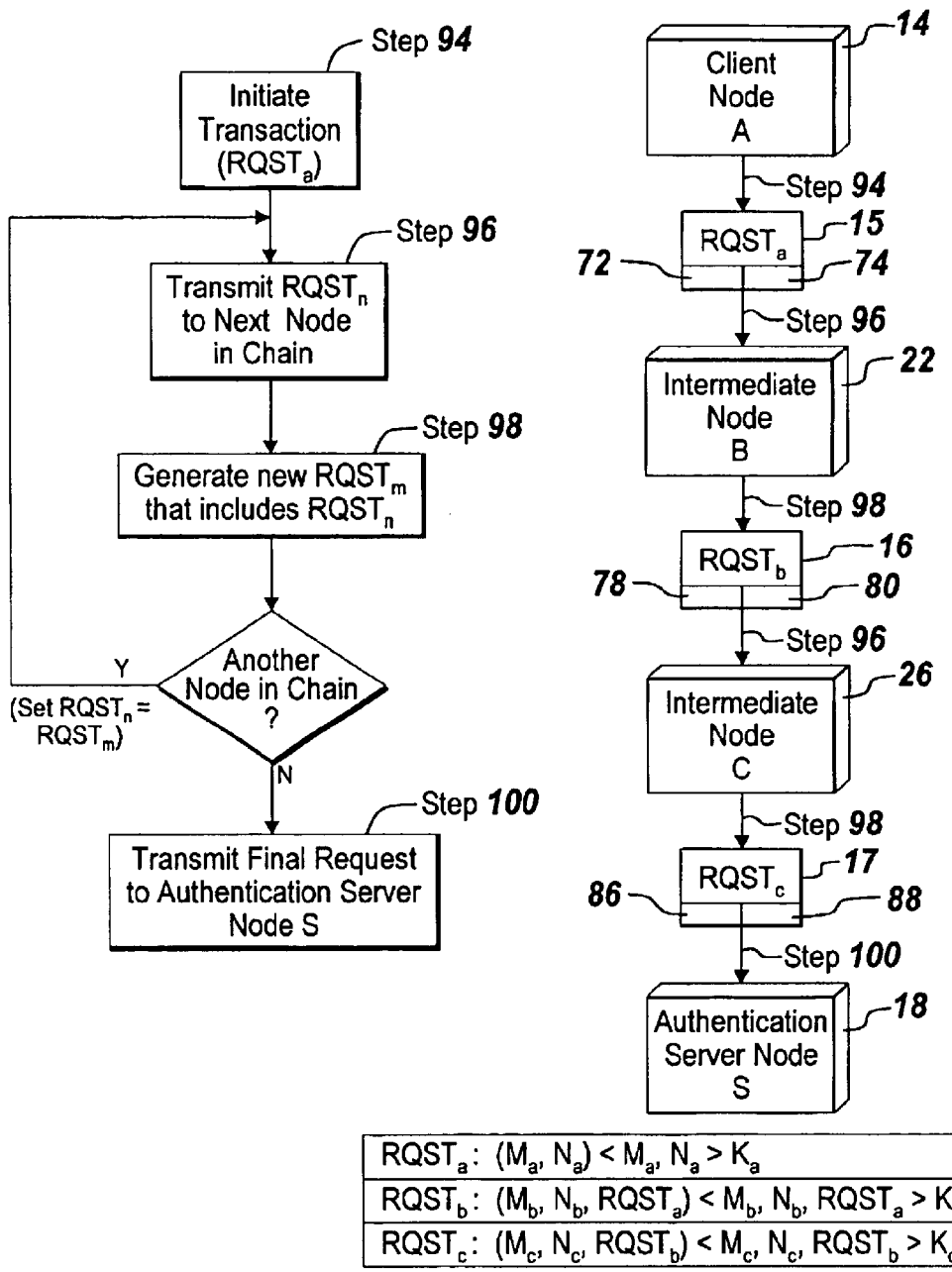
FIG. 4 is a flow chart and block diagram representation of an embodiment of a process by which embedded requests are generated.

FIG. 4 presents a flowchart and a block diagram illustrating an embodiment of an exemplary process by which the client node A 14 and each intermediate node 22, 26 generate and forward a recursively constructed final request to the authentication server node S 18. The client node A 14 initiates (step 94) an authentication request RQSTa 15. In the embodiment shown, RQSTa 15 includes a plaintext portion 72 and a sealed version 74 of the plaintext portion 72. The sealed version 74 is sealed by the client node A 14 using the shared key Ka as described previously and below. Throughout the specification, the sealing of data (here, a copy of the plaintext portion 72) is accomplished by applying a one-way hash-function to the data. One-way hash functions take variable-length input strings and produce fixed-length output strings. An attribute of such a one-way hash function is that reconstructing the input string from the output string is computationally difficult. Examples of one-way hash functions that can be used to practice the invention are well known in the art.

A purpose of the one-way hash function is to guarantee the integrity of the message data. For example, when the server S 18 receives the plaintext portion 72 and the sealed version 74 from the client node A 14, the server S 18 can apply the one-way hash function to the plaintext portion 72 using the secret key Ka shared with the client node A 14. Thus, the server S 18 produces another sealed version of the plaintext portion 72, which the server S 18 can compare with the sealed version 74 received from the client node A 14. A match between the sealed versions indicates that the integrity of the data was maintained during the transmission from the client node A 14 to the server node S 18. Sealing can be accomplished by employing other techniques (e.g., encryption algorithms). Accordingly, any reference hereafter to sealing or sealed data contemplates any method, e.g., a one-way hash function or an encryption algorithm, capable of producing the seal.

The plaintext portion 72 is a bit string of data that includes a nonce Na combined with a message Ma. The nonce Na is a value randomly generated by the client node A 14 that uniquely identifies the authentication request at client node A 14. Client node A 14 stores the nonce Na in memory for later reference. The message Ma is a bit string that identifies the two nodes for which a session key is sought, here client node A 14 and the intermediate node B 22. An exemplary notation for the message Ma is (A, B). In one embodiment, the nonce Na is concatenated to the end of the message Ma such that an exemplary notation for the plaintext portion 72 is (Ma, Na).

The sealed version 74 is a sealed bit string produced from the data Ma, Na in the plaintext portion 72 and is referred to as message digest, Da. The client node A 14 can produce the message digest Da by computing a one-way hash function of the plaintext data Na and Ma using the key, Ka, shared exclusively with the authentication server node S 18. Before generating the message digest Da, the client node A 14 inserts a copy of the key Ka into a copy of the plaintext portion 72. The key Ka can be placed in front of the copy of the plaintext portion 72 to add randomness to the message and/or at the end of the copy of the plaintext portion 72 to prevent the digest Da from being extended. Although the invention does not require placement at both the front and at the end, performance of both strengthens the protection of the message digest Da. An exemplary notation for the message digest Da is:

<Ma, Na>Ka.

To form RQSTa 15, the plaintext portion 72 and sealed version 74 are combined. In one embodiment, the sealed version 74 is concatenated to the end of the plaintext portion 72. An exemplary notation for the RQSTa 15 is:

(Ma, Na), Da or (Ma, Na), <Ma, Na>Ka.

Note that the parenthesis "( )," braces "<>," spaces and commas are for notation purposes only and are not part of the string of data that form RQSTa 15 (or any other bit string of data).

The client node A 14 transmits (step 96) the RQSTa 15 to the intermediate node B 22 by way of communication link 30. Responsive to the RQSTa 15, the intermediate node B 22 produces (step 98) a new request RQSTb 16. Again, the RQSTb 16 includes a plaintext portion 78 and a sealed version 80 of the plaintext portion 78 as described previously with respect to RQSTa 15. The plaintext and sealed portions 78, 80 each include the plaintext portion 72 and the sealed version 74 of RQSTa 15.

Specifically, the plaintext portion 78 is a bit string that includes a message, Mb, and a nonce Nb generated by intermediate node B 22, and the RQSTa 15 is received from client node A 14. Intermediate node B 22 stores the nonce Nb in memory for later reference when verifying a response from server node S 18. An exemplary notation for the plaintext portion 78 is (Mb, Nb), (Ma, Na), <Ma, Na>Ka or (Mb, Nb, RQSTa).

Note that the plaintext portion 78 includes sealed data, which come from RQSTa 15.

In this embodiment, intermediate node B 22 concatenates the nonce Nb to the message Mb, and RQSTa 15 to the end of the nonce Nb. In other embodiments, the order may differ. As with message Ma, the message Mb includes the identities of the nodes for which a session key is requested. Thus, if the session key is required between intermediate node B 22 and intermediate node C 26, the message Mb is (B, C).

Similar to previous RQSTa 15, the sealed version 80 is an sealed bit string representing the data in the plaintext portion 78. In one embodiment, the sealed version 80 includes a message digest, Db, produced by computing a one-way hash function of the data components Mb, Nb, and RQSTa 15 using the key, Kb, shared exclusively by nodes B and S. An exemplary notation for the sealed version 80, which is the message digest Db, is <Mb, Nb, Ma, Na, <Ma, Na>Ka>Kb or <Mb, Nb, RQSTa>Kb.

In step 98, the intermediate node B 22 generates the new request RQSTb 16 as a combination of the plaintext portion 78 and the sealed version 80. In one embodiment, the sealed version 80 is concatenated to the end of the plaintext portion 78 as described previously and therefore an exemplary notation for the RQSTb 16 is (Mb, Nb, RQSTa), <Mb, Nb, RQSTa>Kb, in which the RQSTa 15 is recursively nested within the RQSTb 16. Expanded notation for RQSTb is:

(Mb, Nb, (Ma, Na), <Ma, Na>Ka), <Mb, Nb, (Ma, Na), <Ma, Na>Ka>Kb.

Similarly as for client node A 14 and intermediate node B 22, intermediate node C 26 produces a new request RQSTc 17. RQSTc 17 includes a plaintext portion 86 and a sealed version 88 of the plaintext portion 86.

The plaintext portion 86 is a bit string that includes a message Mc, a nonce Nc, and the RQSTb 16. Exemplary notation here for Mc is (C, S), and for the plaintext portion 86, (Mc, Nc, RQSTb). Intermediate node C 26 stores the nonce Nc in memory for use when verifying a response from server node S 18. Again, the message Mc includes the identities of the two intermediate nodes for which a session key is sought.

The sealed version 88 is a sealed bit string representing the data, Mc, Nc, and RQSTb 16, in the plaintext portion 86. In one embodiment, sealed version 88 includes a message digest, Dc, produced by computing a one-way hash function of the data components Mc, Nc, and RQSTb 16 using the key Kc. Kc is the key shared exclusively between intermediate node C 26 and server node S 18. An exemplary notation for the message digest Dc is <Mc, Nc, RQSTb>Kc.

In step 98, the intermediate node C 26 generates the new request RQSTc 17 as a combination of the plaintext portion 86 and the sealed version 88, for example, by concatenating the sealed version 88 to the end of the plaintext portion 86. An exemplary notation for RQSTc 17 is (Mc, Nc, RQSTb), <Mc, Nc, RQSTb>Kc.

in which the RQSTb 16 is recursively nested within the RQSTc 17. Expanded notation for RQSTc is:

(Mc, Nc, (Mb, Nb, (Ma, Na), <Ma, Na>Ka), <Mb, Nb, (Ma, Na), <Ma, Na>Ka>Kb) <Mc, Nc,(Mb, Nb, (Ma, Na), <Ma, Na>Ka), <Mb, Nb, (Ma, Na), <Ma, Na>Ka>Kb >Kc.

The form of the request generated at each node X requesting a session key for communication with node X+1 generalizes to:

RQSTx=(X, X+1, Nx, RQSTx−1), <X, X+1, Nx, RQSTx−1>Kx, where X−1 is the identity of the previous node, if any, and RQSTx−1 is the request given by the previous node X−1 for requesting a session key for communication between node X−1 and X.

Evaluating the Authentication Request

In step 100, the last intermediate node in the chain of nodes transmits the final request to server node S 18. For illustration purposes, the last intermediate node in the example shown is intermediate node C 26, and the final request is RQSTc 17. Accordingly, as described above, the final request RQSTc 17 received by server node S 18 can be expressed as:

(Mc, Nc, RQSTb) <Mc, Nc, RQSTb>Kc, where the plaintext portion 86 is (Mc, Nc, RQSTb), and the sealed version 88 of the plaintext portion 86 is <Mc, Nc, RQSTb>Kc.

Figure 5:
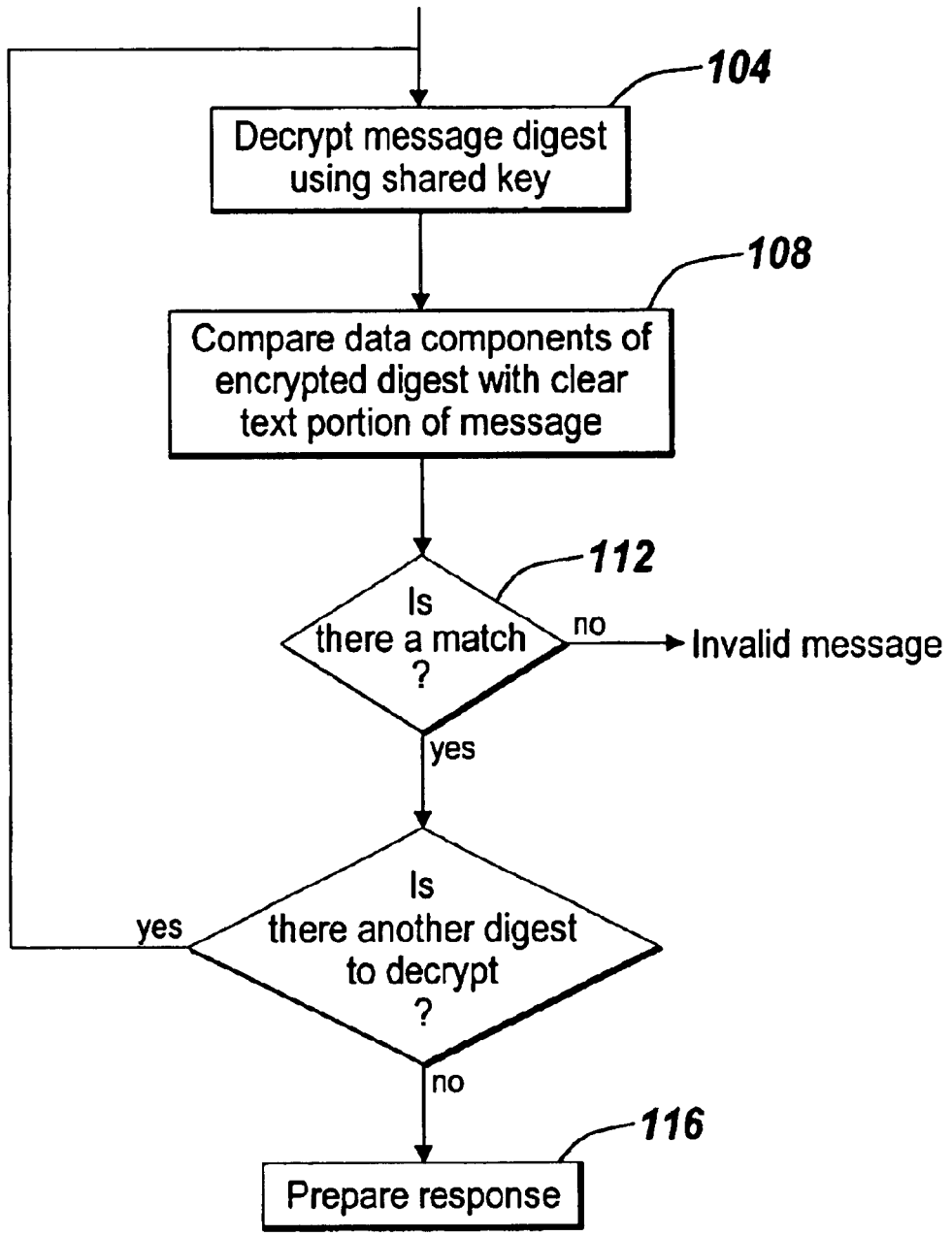
FIG. 5 is a flow chart representation of an embodiment of a process by which the authentication server processes the embedded requests.

FIG. 5 shows an exemplary process by which the server node S 18 recursively unravels RQSTC 17 to (1) authenticate each node in the chain of nodes and (2) authenticate the integrity of the data in each request within RQSTc 17 (i.e., RQSTb 16 and RQSTa 15). The server node S 18 uses (step 104) the key shared with intermediate node C 26, Kc, to determine the message digest Dc. From the digest Dc, the server node S 18 extracts the data Mc, Nc, and RQSTb 17 from the sealed version 88.

In step 108, server node S 18 compares the extracted data, Mc, Nc, and RQSTb 16, with the data Mc, Nc, and RQSTb 16 in the plaintext portion 86. If the extracted data match the plaintext data, the server node S 18 knows that intermediate node C 26 is the sender of the RQSTc 17 because, other than server node S 18, only intermediate node C 26 knows the shared key Kc used to create the sealed version 88. Server node S 18 therefore also knows that the data Mc, Nc, and RQSTb 16 are unaltered during the transmission from intermediate node C 26 because the extracted and the plaintext data are the same. If the extracted data do not match the plaintext data, the final request RQSTc 17 is invalid. The server node S 18 can then ignore such a request.

If RQSTc 17 is determined to be valid, server node S 18 then evaluates RQSTb 16, which can be expressed as:

(Mb, Nb, RQSTa), <Mb, Nb, RQSTa>Kb.

The plaintext portion 78 is therefore (Mb, Nb, RQSTa)

and the sealed version 80 of the plaintext portion 78 is

Db or

<Mb, Nb, RQSTa>Kb.

Server node S 18 then uses Kb to extract (step 104) the data Mb, Nb, and RQSTa 15 from the sealed version 80 and again compares (step 108) the extracted data with the data Mb, Nb, and RQSTa 15 of the plaintext portion 78.

In step 112, the extracted data are compared with the plaintext data components and if the components match, intermediate node B 22 is the sender of the RQSTb 16 because only nodes B and S know the shared key Kb used to create the sealed version 80. Again, this match shows that the data Mb, Nb, and RQSTa 15 are unchanged during the transmission from intermediate node B 22 to server node S 18. In one embodiment, if the extracted data do not match the plaintext data, server node S 18 can ignore the request RQSTc 17. In other embodiments, the server node S 18 can process valid portions of RQSTc.

If RQSTb is valid, the above-described process is repeated by server node S 18 with respect to RQSTa 15.

Return Protocol

Figure 6:
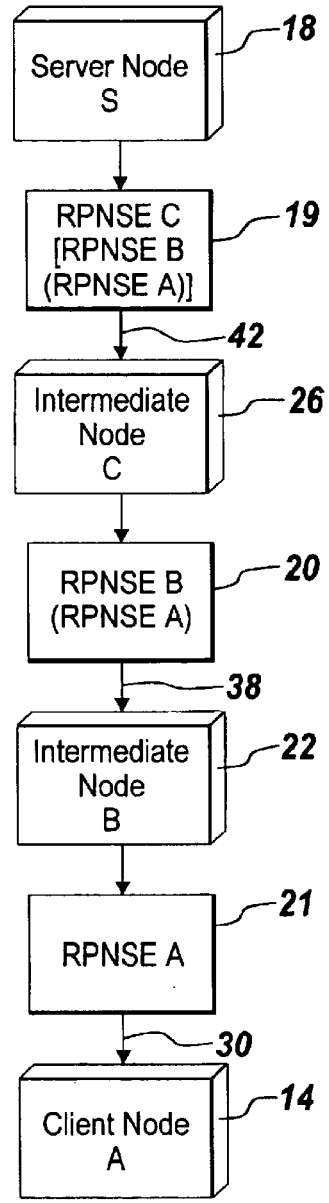
FIG. 6 is a diagram showing an exemplary return flow of responses from the authentication server node to the client node by way of the first and second intermediate nodes.

FIG. 6 shows general operation of the client server system 2 in the return direction from server node S 18 to client node A 14 through nodes C and B, 26 and 22, respectively. Generally, server node S 18 produces a full response, e.g., RPNSEc 19, to a valid final request, e.g., RQSTc 17 described previously. The full response includes a response for each node in the chain of nodes requesting a session key. Each response contains the session key or keys intended for that node. Each response is also embedded within a response to a previous node as described below. As shown, RPNSEc 19 includes RPNSEb 20, and RPNSEb 20 includes RPNSEa 21.

These responses traverse the chain of nodes in the reverse order by which the final request RQSTc 17 reached server node S 18. For example, intermediate node C 26 receives a response to its request for a session key before intermediate node B 22 receives its response to its request for a session key. As such, intermediate node C 26 removes that portion of the response RPNSEc 19 that is intended for intermediate node C 26 and forwards the remainder of the response, RPNSEb 20, to intermediate node B 22. Likewise, intermediate node B 22 extracts that portion of the response intended for intermediate node B 22 and forwards the remainder of the response, RPNSEa 21, to client node A 14. Thus, by this single traversal of the chain of nodes, server node S 18 can securely deliver at least one session key to each node in the chain.

Generation of the Response

Figure 7A:
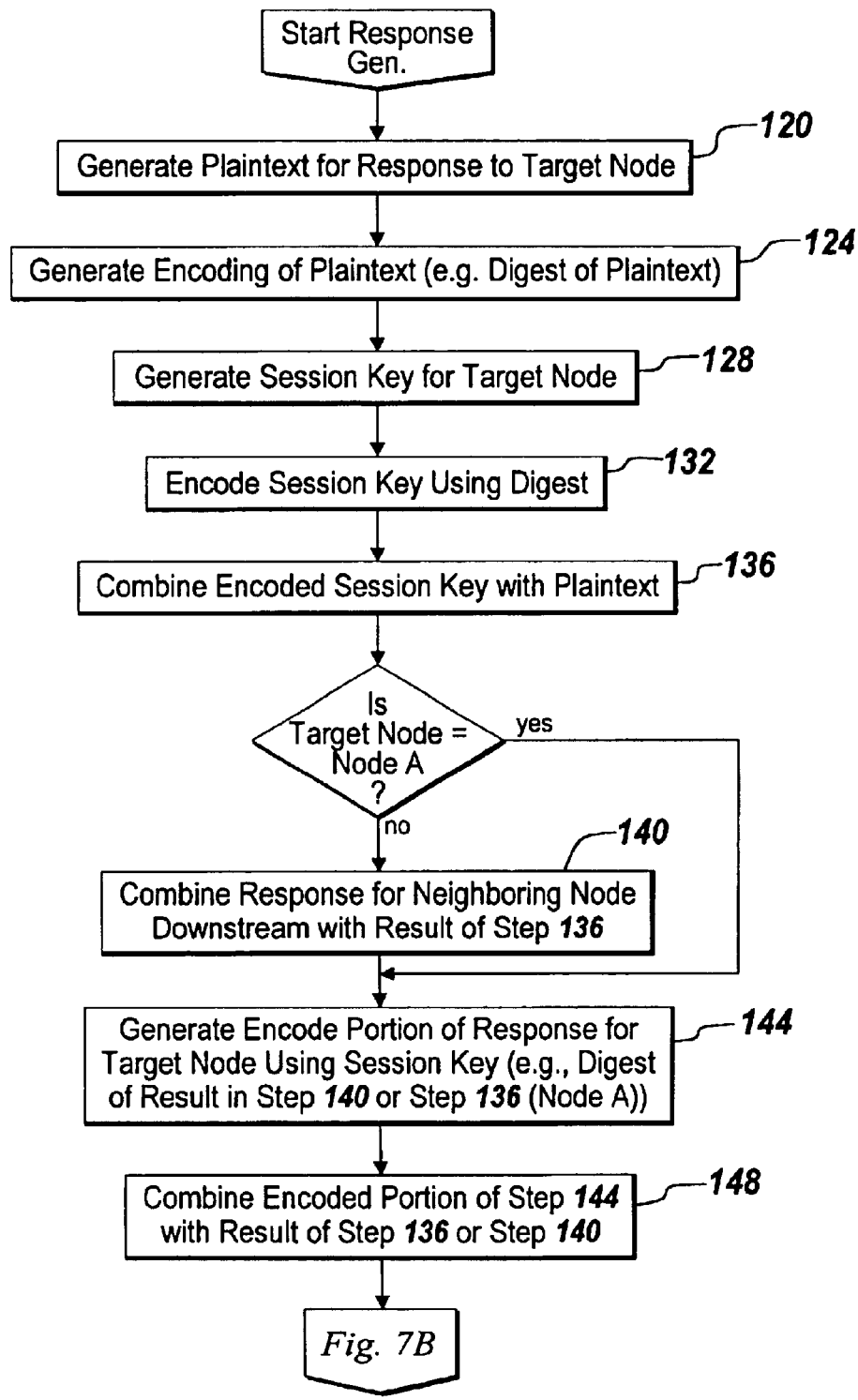
FIGS. 7A and 7B provide a flow chart representation of an embodiment of a process by which the authentication server generates a response having at least one session key for each node in the chain of nodes.
Figure 7B:
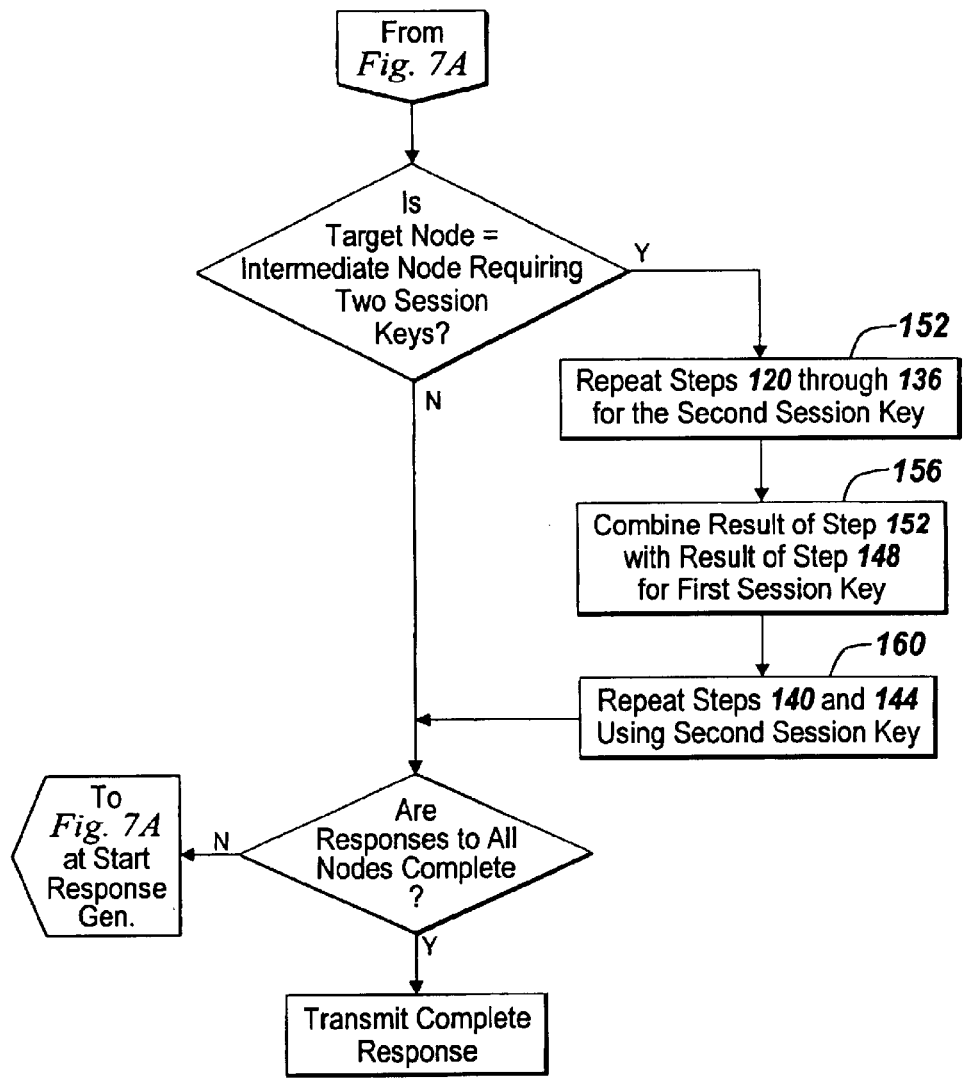

FIGS. 7A and 7B shows an exemplary process by which server node S 18 produces the complete response RPNSEc 19. Server node S 18 generates RPNSEc 19 using session keys intended for the respective nodes such that each node in the chain can access only those session keys intended for that node.

Generating RPNSEa

Because of the recursive nesting of responses, the response intended for client node A 14, RPNSEa 21, is the most deeply nested response within the full response, RPNSEc 19. Accordingly, server node S 18 can construct RPNSEc 19 starting with RPNSEa 21. In step 120, server node S 18 generates plaintext intended for client node A 14. The plaintext can include a response message Rab and one or more nonces. Rab includes the identities of the two nodes for which the session key is intended, here nodes A and B. An exemplary notation for Rab is (A, B). In one embodiment, the plaintext includes nonces Na and Nb, which are the same nonces as Na and Nb sent to server node S 18 in the request RQSTC 17. Including the nonce Na in RPNSEa 21 enables client node A 14 to determine that RPNSEa 21 is current. Client node A 14 can determine from the nonce Na that the RPNSEa 21 is a response from server node S 18 to a current outstanding request and not a unauthorized replication of a valid, previous communication between nodes A and S. In one embodiment, server node S 18 concatenates the nonces to the end of the response message Rab, which can be expressed as:

(Rab, Na, Nb).

The server node S 18 generates (step 124) a sealed version of the plaintext data (Rab, Na, Nb). In one embodiment, the sealed version includes a message digest Dra produced by computing a one-way hash function of the plaintext data Rab, Na, Nb using the key Ka. An exemplary notation for the message digest Dra is <Rab, Na, Nb>Ka.

By including more than one nonce in the response message digest Dra, the digest is ensured to be distinct from any message digest Da created in the forward direction by client node A 14. Thus, any intruding process that captures and retains a message digest Da in the forward direction cannot use that message digest to extract the session key from the response message digest Dra.

Server node S 18 generates (step 128) a session key, Kab, which could be used by client node A 14, for example, to preserve data integrity or with encryption to preserve data confidentiality when communicating with intermediate node B 22. Server node S 18 next encodes (step 132) the session key Kab to produce encoded session key enKab. In one embodiment, the encoded session key Kab is generated by a bit-wise exclusive-OR (XOR) of the two bit strings. That is, the session key Kab is XOR'd with the message digest Dra:

enKab=(Kab XOR <Rab, Na, Nb>Ka).

In step 136, server node S 18 combines enKab with the plaintext response message Rab. In one embodiment, this is accomplished by appending enKab to the end of Ra. The resulting plaintext is (Rab, Na, Nb, enKab), which expands to (Rab, Na, Nb, (Kab XOR <Rab, Na, Nb>Ka)).

Because client node A 14 is the last node in the chain of nodes to receive a response from server node S 18, the RPNSEa 21 does not contain a response to a subsequent node. Accordingly, the next step in the process of generating RPNSEa 21 is to generate (step 144) a sealed version of the plaintext data Rab, Na, Nb, enKab. In one embodiment, computing a one-way hash function of the plaintext data produced in step 136, namely Rab, Na, Nb, enKab, using the session key Kab, produces the sealed version. As before, other sealing methods can be used.

Server node S 18 completes the response directed to client node A 14 by combining (step 148) the sealed version produced in step 144 with the plaintext produced in step 136. The resulting response to client node A 14, RPNSEa 21, can be expressed as:

(Rab, Na, Nb, enKab), <Rab, Na, Nb, enKab>Kab

Generating RPNSEb

Server node S 18 generates (step 120) plaintext intended for intermediate node B 22. The plaintext includes a response message Rba and one or more nonces. Like RPNSEa 21, the nonces in RPNSEb 20 can be Na and Nb. Rba includes the identities of the two nodes for which an enclosed session key can be used for conducting secure communications. An exemplary notation for Rba is (B, A). In one embodiment, server node S 18 concatenates the nonces to the end of the response message Rba, which can be expressed as:

(Rba, Nb, Na).

In step 124, server node S 18 generates a sealed version of the plaintext data Rba, Nb, Na. In one embodiment, the sealed version includes a response message digest Drba. Server node S 18 produces Drba by computing a one-way hash function of the data Rba, Nb, Na using the key Kb shared exclusively with intermediate node B 22. An exemplary notation for the response message digest, Drba, is <Rba, Nb, Na >Kb.

Server node S 18 generates (step 128) a session key, Kba, which intermediate node B 22 can use, for example, with encryption to encode communications with client node A 14. In one embodiment, the session key Kba has the same value as the session key Kab. Accordingly, intermediate node B 22 can use Kba to decode communications encoded by client node A 14 using Kab, and client node A 14 can use Kab to decode communications encoded by intermediate node B 22 using Kba. Server node S 18 next encodes (step 132) the session key Kba to form encoded session key enKba. In one embodiment, the encoded session key Kba is generated by exclusive-ORing the session key Kba with the response message digest Drba, i.e., enKba=(Kba XOR <Rba, Nb, Na>Kb).

In step 136, server node S 18 combines enKba with the plaintext response message Rba, for example, by appending enKba to Rba. The resulting plaintext can be expressed as:

(Rba, Nb, Na, enKba), which expands to (Rba, Nb, Na, (Kba XOR <Rba, Nb, Na>Kb)).

Because intermediate node B 22 is an intermediate node in the chain of nodes, the response directed to intermediate node B 22 includes the response to a subsequent node, here client node A 14. Server node S 18 combines (step 140) the response to client node A 14, RPNSEa 21, with the plaintext produced in step 136. The plaintext result of step 140 can be expressed as:

(Rba, Nb, Na, enKba, RPNSEa).

A sealed version of this plaintext is generated (step 144), for example, by computing a one-way hash function of the plaintext data components produced in step 140 using the session key Kba. The sealed version can be expressed as <Rba, Nb, Na, enKba, RPNSEa>Kba. Server node S 18 combines (step 148) the sealed version produced in step 144 with the plaintext produced in step 140. The result can be expressed as:

(Rba, Nb, Na, enKba, RPNSEa), <Rba, Nb, Na, enKba, RPNSEa>Kba.

Being an intermediate node, intermediate node B 22 communicates with neighboring nodes A and C, 14 and 26, respectfully. Intermediate node B 22, therefore, requires a session key to communicate securely with client node A 14 and another session key to communicate securely with intermediate node C 26. As described above, the session key for communicating with client node A 14 is Kba. By repeating steps 120 through 136, server node S 18 includes (step 152) a second session key, Kbc, in the response so that intermediate node B 22 can securely communicate with intermediate node C 26. The result of repeating steps 120 through 136 with respect to Kbc is plaintext that can be expressed as:

(Rbc, Nb, Nc, (Kbc XOR <Rbc, Nb, Nc>Kb)), where (Kbc XOR <Rbc, Nb, Nc>Kb) is the encoded session key Kbc (hereafter enKbc); where <Rbc, Nb, Nc>Kb is the message digest Drbc of plaintext data Rbc, Nb, Nc using the shared key Kb; where Nb and Nc are nonces that are the same as those nonces Nb and Nc received by server node S 18 in the RQSTC 17; and where Rbc is a response message directed to intermediate node B 22 containing the identities of the nodes, here B and C, for which the session key Kbc is intended to provide secure communication.

In step 156, server node S 18 combines the plaintext produced by step 152, namely (Rbc, Nb, Nc, enKbc), with the result of step 148, namely (Rba, Nb, Na, enKba, RPNSEa), <Rba, Nb, Na, enKba, RPNSEa>Kba, to produce a plaintext result that can be expressed as:

(Rbc, Nb, Nc, enKbc, Rba, Nb, Na, enKba, RPNSEa, <Rba, Nb, Na, enKba, RPNSEa>Kba),

In step 160, server node S 18 completes the response, RPNSEb 20, by repeating steps 140 and 144 with respect to the second session key, Kbc. The resulting response RPNSEb 20 can be expressed as:

(Rbc, Nb, Nc, enKbc, Rba, Nb, Na, enKba, RPNSEa, <Rba, Nb, Na, enKba, RPNSEa>Kba), <Rbc, Nb, Nc, enKbc, Rba, Nb, Na, enKba, RPNSEa, <Rba, Nb, Na, enKba, RPNSEa>Kba>Kbc.

Generating RPNSEc

To generate RPNSEc, the process returns to step 120. Server node S 18 generates plaintext and a sealed version of the plaintext that can include a response message Rcb and one or more nonces. The plaintext can include nonces Nb and Nc, which are the same nonces, Nb and Nc, sent to server node S 18 in the request RQSTC 17. Rcb includes the identities of the two nodes for which the session key is intended, here intermediate nodes B and C, 22 and 26, respectively. An exemplary notation for Rcb is (C, B). In one embodiment, server node S 18 concatenates the nonces to the response message Rcb, which can be expressed as:

(Rcb, Nc, Nb).

In step 124, server node S 18 generates a sealed copy of the plaintext data components Rcb, Nc, and Nb. The sealed copy can include a message digest, Drc, produced by computing a one-way hash function of the data components Rcb, Nc, and Nb using the key Kc shared exclusively with server node S 18. An exemplary notation for the message digest Drc is <Rcb, Nc, Nb>Kc.

In step 128, server node S 18 generates a session key, Kcb, which intermediate node C 26 can use, for example, with encryption to encode communications with intermediate node B 22 so as to preserve data confidentiality. The session key Kcb has the same value as the session key Kbc. Accordingly, intermediate node C 26 can use Kcb to decode communications encoded by intermediate node B 22 using Kbc, and intermediate node B 22 can use Kbc to decode communications encoded by intermediate node C 26 using Kcb.

Server node S 18 encodes the session key Kcb to produce an encoded session key enKcb (step 132). In one embodiment, enKcb is generated by exclusive-ORing (XOR) the session key Kcb with the message digest Drc, i.e., enKcb=(Kcb XOR <Rcb, Nc, Nb>Kc).

In step 136, server node S 18 combines enKcb with the plaintext response message Rcb, for example, by appending enkcb to Rcb to produce the following plaintext:

(Rcb, Nc, Nb, enKcb).

Because intermediate node C 26 is an intermediate node in the chain of nodes, the response directed to intermediate node C 26 includes the response to a subsequent node, here intermediate node B 22. Server node S 18 combines (step 140) the response to intermediate node B 22, RPNSEb 20, with the plaintext produced in step 136. The plaintext result of step 140 can be expressed as:

(Rcb, Nc, Nb, enKcb, RPNSEb).

In step 144, a sealed version of this plaintext is generated, for example, by computing a one-way hash function of the plaintext data produced in step 140, namely Rcb, Nc, Nb, enKcb, and RPNSEb, using the session key Kcb. The resulting sealed version is:

<Rcb, Nc, Nb, enKcb, RPNSEb>Kcb.

In one embodiment, the last node in the chain before server node S 18 requires only one session key. Accordingly, in step 148, server node S 18 can complete the response RPNSEc 19 by combining the sealed version produced in step 144 with the plaintext produced in step 136. Alternatively, intermediate node C 26, as an intermediate node, can require another session key for communicating with server node S 18. In such an embodiment, the generation of RPNSEc 19 continues by encapsulating a second session key in a similar manner as used to include a second session key in RPNSEb 20 described above.

When intermediate node C 26 does not require two session keys, the final response, RPNSEc, passing from server node S 18 to intermediate node C 26 can be expressed as:

(Rcb, Nc, Nb, enKcb, RPNSEb), <Rcb, Nc, Nb, enKcb, RPNSEb>Kcb.

The response to each node X requesting a session key generalizes to:

$RPNSEx=(\ldots, enKx.x+1, (\ldots, enKx.x-1, RPNSEx-1), <\ldots, enKx.x-1, RPNSEx-1>Kx.x-1), <\ldots, enKx.x+1, (\ldots, enKx.x-1, \ldots RPNSEx-1), <\ldots, enKx.x-1, RPNSEx-1>Kx.x-1>Kx.x+1$, where X is the identity of the node targeted for the RPNSEx, X+1 is the identity of the neighboring node toward the server 18, and X−1 is the identity of the neighboring node away from the server 18. Note that the generalized form applies to intermediate nodes requiring two session keys, and that in some implementations the first and last nodes in the chain (e.g., client node A 14 and intermediate node C 26) may receive only one session key.

Protocol for Processing Server Response

Figure 8:
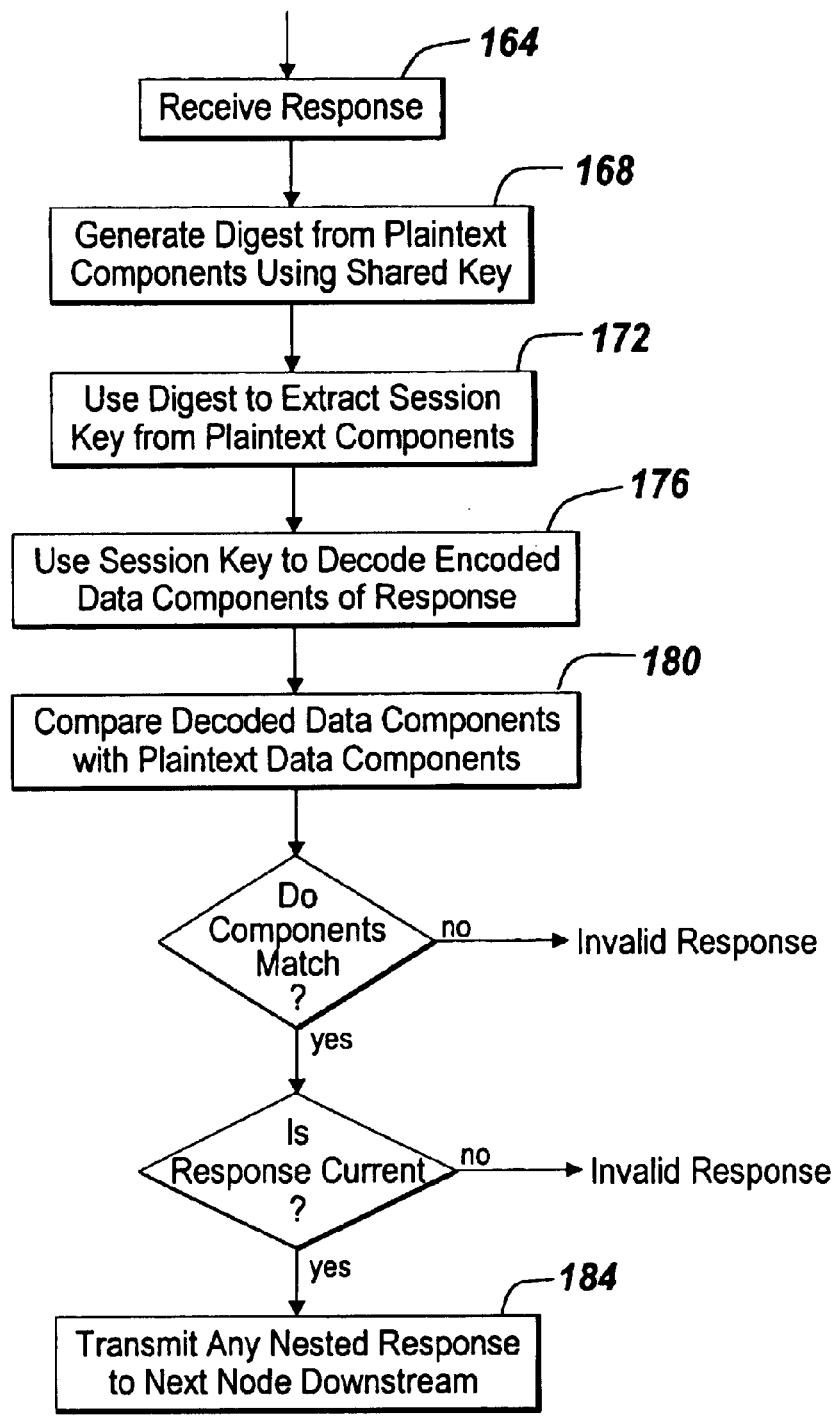
FIG. 8 is a flow chart representation of an embodiment of a process by which each node receiving a response extracts at least one session key from that response.

FIG. 8 shows an exemplary process by a full response from server node S 18 is processed by each node in a chain of nodes to obtain individual session keys.

Evaluating RPNSEc

For illustration purposes, intermediate node C 26 is the first node in the chain of nodes to receive the response, here RPNSEc 19, which has been generated and issued by server node S 18 (step 164). As described above, RPNSEc 19 includes a plaintext portion and a sealed portion. The plaintext portion includes Rcb, Nc, Nb, enKcb, and the next embedded response RPNSEb 20. Intermediate node C 26 cannot decipher any of the session keys sealed within RPNSEb 20 because RPNSEb is sealed with key Kb.

Because intermediate node C 26 has the key Kc, intermediate node C 26 can generate (step 168) the message digest Drc from the plaintext components Rcb, Nc, Nb included in the response RPNSEc 19. Intermediate node C 26 then uses the message digest Drc to extract the session key Kcb from the plaintext by performing a bit-wise exclusive-OR operation using enKcb and the message digest Drc (step 172). This exclusive-OR operation recovers Kcb because exclusive ORing twice in succession with the same value reproduces the original value. For example:

$Kcb\ XOR\ Drc=enKcb;$  1).

$enKcb\ XOR\ Drc=Kcb.$  2).

Once intermediate node C 26 obtains Kcb, intermediate node C 26 uses (step 176) Kcb to extract the data within the sealed portion of RPNSEc 19. The extracted data include the embedded response RPNSEb 20. Intermediate node C 26 then compares (step 180) the extracted data with the plaintext data.

If the extracted data do not match the plaintext data, RPNSEc 19 is invalid. If instead the extracted data match the plaintext data, intermediate node C 26 knows that server node S 18 is the sender of the RPNSEc 19 because only server node S 18 and intermediate node C 26 know the key Kc used to produce the encoded session key enKcb. Intermediate node C 26 also knows that the data Rcb, Nc, Nb, and RPNSEb are unaltered during the transmission to intermediate node C 26 from server node S 18. Further, intermediate node C 26 can compare the nonce Nc received in RPNSEc 19 with the nonce that intermediate node C 26 stored upon sending RQSTc 17 to server node S 18. A match indicates the RPNSEc 19 is a current response to an outstanding request. Intermediate node C 26 can now use the extracted session key Kcb to encode subsequent communications with intermediate node B 22. If RPNSEc 19 is valid, intermediate node C 26 transmits (step 184) the embedded response, RPNSEb 20, to intermediate node B 22.

Evaluating RPNSEb

Intermediate node B 22 receives (step 164) RPNSEb 20, which also includes plaintext and sealed data. As described above, plaintext portion of RPNSEb 20 is (Rbc, Nb, Nc, enKbc, Rba, Nb, Na, enKba, RPNSEa), <Rba, Nb, Na, enKba, RPNSEa>Kba.

Because intermediate node B 22 has the key Kb, intermediate node B 22 can generate (step 168) the message digests Drbc and Drba from the plaintext components included in the response RPNSEb 20. Intermediate node B 22 uses (step 172) the message digest Drbc to extract the session key Kbc by exclusive-ORing enKbc with the message digest Drbc. Likewise, intermediate node B 22 uses the message digest Drba to extract the session key Kba by exclusive-ORing enKba with the message digest Drba. Upon extracting (step 176) Kbc, intermediate node B 22 uses Kbc to extract the data within the sealed version of RPNSEb 20. A portion of these extracted data requires further extraction because the session key Kba also seals that portion. Intermediate node B 22 then uses Kba to extract the data within this portion, one of such data being the embedded response RPNSEa. Intermediate node B 22 then compares (step 180) the extracted data with the plaintext data.

Again, if the extracted data do not match the plaintext data, RPNSEb 20 is invalid. If instead the extracted data match the plaintext data, intermediate node B 22 knows that server node S 18 is the generator of the RPNSEb 20 because only intermediate node B 22 and server node S 18 has the key Kb used to create the encoded session keys enKbc and enKba. Because of the match, intermediate node B 22 also knows that the data Rbc, Rba, Nc, Nb, Na, and RPNSEa are unaltered during the transmission to intermediate node B 22 from server node S 18. Further, intermediate node B 22 can compare the nonce Nb received in RPNSEb 20 with the nonce that intermediate node B 22 stored upon sending RQSTb 16 to intermediate node C 26. A match indicates the RPNSEb 20 is a current response to an outstanding request. Intermediate node B 22 can now use the extracted session key Kba to encode subsequent communications with client node A 14 and the extracted session key Kbc to encode subsequent communications with intermediate node C 26. If RPNSEb 20 is valid, intermediate node B 22 transmits (step 184) the embedded response, RPNSEa 21, to client node A 14.

Evaluating RPNSEa

Upon receiving RPNSEa 21, client node A 14 evaluates RPNSEa 21 in a manner similar to the evaluation of RPNSEc 19 by intermediate node C 26. Client node A 14 receives (step 164) RPNSEa 21 from intermediate node B 22. RPNSEa 21 includes plaintext and sealed data. As described above, the plaintext portion of RPNSEa 21 is (Rab, Na, Nb, enKab).

Because client node A 14 has the key Ka, client node A 14 can generate (step 168) the message digest Dra from the plaintext components Rab, Na, Nb included in the response RPNSEa 21. Client node A 14 then uses (step 172) the message digest Dra to extract the session key Kab from the plaintext by exclusive-ORing enKab with the message digest Dra. After obtaining the session key Kab, client node A 14 uses (step 176) Kab to extract the data within the sealed portion of RPNSEa 21. Client node A 14 then compares (step 180) the extracted data with the plaintext data. Again, if the extracted data do not match the plaintext data, client node A 14 can ignore RPNSEa 21 because RPNSEa 21 is invalid. If the extracted data match the plaintext data, client node A 14 knows that server node S 18 is the generator of the RPNSEa 21 because only server node S 18 and client node A 14 have the key Ka used to create the encoded session key enKab. Client node A 14 also knows that the data Rab, Na, Nb, and RPNSEa are unaltered during the transmission to client node A 14 from server node S 18.

Further, client node A 14 can compare the nonce Na received in RPNSEa 21 with the nonce that client node A 14 stored upon sending RQSTa 15 to intermediate node B 22. A match indicates the RPNSEa 21 is a current response to an outstanding request. Accordingly, client node A 14 can use the extracted session key Kab to encode subsequent communications with intermediate node B 22. At client node A 14, the propagation of responses completes. With one round-trip traversal of the forward and reverse paths, each node in a chain of nodes has securely requested and securely received at least one session key from the server node S 18.

While the invention has been shown and described with reference to specific preferred embodiments, it should be understood by those skilled in the art that various changes in form and detail may be made therein without departing from the spirit and scope of the invention as defined by the following claims.

We claim:

1. In a network including a first node, a second node, and a third node, a method for securely delivering digital information to the first node from the third node by way of the second node, the method comprising:

receiving a first request at the third node from the first node, wherein the first request is contained within a second request from the second node;

generating first digital information in response to the first request;

operating on the first request and the first digital information to produce a first respeonse, the first response including a representation of the first digital information;

operating on the second request and the first response to produce a second response, the second response including the first response; and transmitting the second response to the second node, wherein the first response is formed using an explicit identifier of the first node as the recipient for the first response and the second response is formed using an explicit identifier of the second node as the recipient for the second response.

2. The method of claim 1 wherein the first digital information is a session key for the first node to use in communications with the second node.

3. The method of claim 2 further comprising encoding the session key using a key shared exclusively with the first node to conceal the session key within the first response.

4. The method of claim 3 further comprising sealing a portion of the first response using the session key.

5. The method of claim 4 further comprising:
receiving the first response from the second node;
decoding the encoded session key using the shared key;
extracting data from the sealed portion of the first response using the decoded session key; and
using the extracted data (1) to authenticate that the session key originated from the third node, (2) to determine that the session key is unaltered during transmission from the third node, and (3) to determine that the first response is a current response from the third node to the request from the first node.

6. The method of claim 2 further comprising:
generating a second session key for the second node to use in communications with the first node;
sealing a portion of the second response containing the first response using the second session key.

7. The method of claim 6 further comprising:
encoding the second session key using a key shared exclusively with the second node; and
including the encoded second session key within the second respnse.

8. The method of claim 2 further comprising:
extracting the first response from the second response at the second node;
transmitting the first response to the first node from the second node; and
extracting the session key from the first response at the first node.

9. The method of claim 8 wherein the session key is a first session key and the second response includes a second session key and further comprising:
extracting the second session key from the second response at the second node, and wherein the first and second session keys provide secure communication between the first node and the second node.

10. The method of claim 1 wherein the second node is a first intermediate node and the network includes a second intermediate node in a communication path between the first intermediate node and the third node, and further comprising:
operating on the first request and the second response to generate a third response, the third response including the second response;
transmitting the third response to the second intermediate node; and
extracting the second response at the second intermediate node for transmission to the first intermediate node.

11. The method of claim 2 wherein generating the first response includes:
generating plaintext;
encoding the session key;
generating a digest of a combination of the plaintext and the encoded session key; and
combining the plaintext, the encoded session key, and the digest to produce the first response.

12. The method of claim 11 wherein generating the digest includes applying a one-way hash function using the session key to the combination of the plaintext and the encoded session key.

13. The method of claim 11 wherein generating the digest includes applying an encryption algorithm using the session key to the combination of the plaintext message and the encoded session key.

14. The method of claim 11 wherein encoding the session key includes:
generating a digest of the plaintext; and
exclusive-ORing the session key with the digest of the plaintext to produce the encoded session key.

15. The method of claim 11 wherein the plaintext includes a first nonce associated with the first node and a second nonce associated with the second node.

16. The method of claim 2 wherein generating the second response includes:
generating plaintext;
generating a second session key;
encoding the second session key;
generating a digest of a combination of the plaintext, the encoded second session key, and the first response; and
combining the plaintext, the encoded second session key, the first response, and the digest to produce the second data response.

17. The method of claim 2 further comprising generating the second request including:
generating a first plaintext at the first node;
generating a first digest of the first plaintext at the first node;
transmitting a first combination of the first plaintext and the first digest from the first node to the second node;
generating a second plaintext at the second node;
generating a second digest of a second combination of the second plaintext and the first combination of the first plaintext and the first digest; and
combining the second plaintext and the second digest to produce the second request.

18. In a network including a client node and an authentication server node, a method for securely delivering a session key to the client node from the authentication server node in response to a request from the client node, the method comprising:
sealing plaintext using the session key;
encoding the session key using a key shared with the client node; and
transmitting a data structure to the client node that includes the encoded session key, an explicit identifier of the client node as the recipient of the data structure, and the sealed plaintext.

19. The method of claim 18 further comprising:
receiving the data structure;
decoding the encoded session key using the shared key;
extracting the sealed plaintext using the decoded session key; and
using the extracted plaintext to authenticate that the session key originated from the authentication server.

20. The method of claim 19, further comprising determining from the extracted plaintext that the decoded session key is unaltered during transmission from the authentication server.

21. The method of claim 19, further comprising determining from the extracted plaintext that the data structure is a current response from the authentication server to the request from the client node.

22. The method of claim 18 wherein the data structure is a first data structure and the network includes an intermediate node in a communication path between the authentication server node and the client node, and further comprising:

operating on the request and the first data structure to generate a second data structure, the second data structure including the first data structure; and transmitting the second data structure to the intermediate node for extracting the first data structure at the intermediate node and for transmitting the extracted first data structure to the client node.

23. A system for securely distributing session keys by way of a network, the network including a first node transmitting a first request to obtain a first session key and a second node in communication with the first node, the second node transmitting a second request to obtain a second session key, wherein the first request is contained within the second request from the second node, the system comprising:

a third node in communication with the second node and receiving the first request by way of the second node, the third node including:

a processor generating (1) a first response by operating on the first request and the first session key, the first fesponse including a representation of the first session key, and (2) generating a second response by operating on the second request and the first response, the second response including the first response; and a network interface coupled to the processor for transmitting the second response to the second node over the network, wherein the first response is formed using an explicit identifier of the first node as the recipient of the first response and the second response is formed using an explicit identifier of the second node as the recipient of the second response.

* * * * *